(No Model.) 2 Sheets—Sheet 1.
E. G. LATTA.
VELOCIPEDE.
No. 328,235. Patented Oct. 13, 1885.
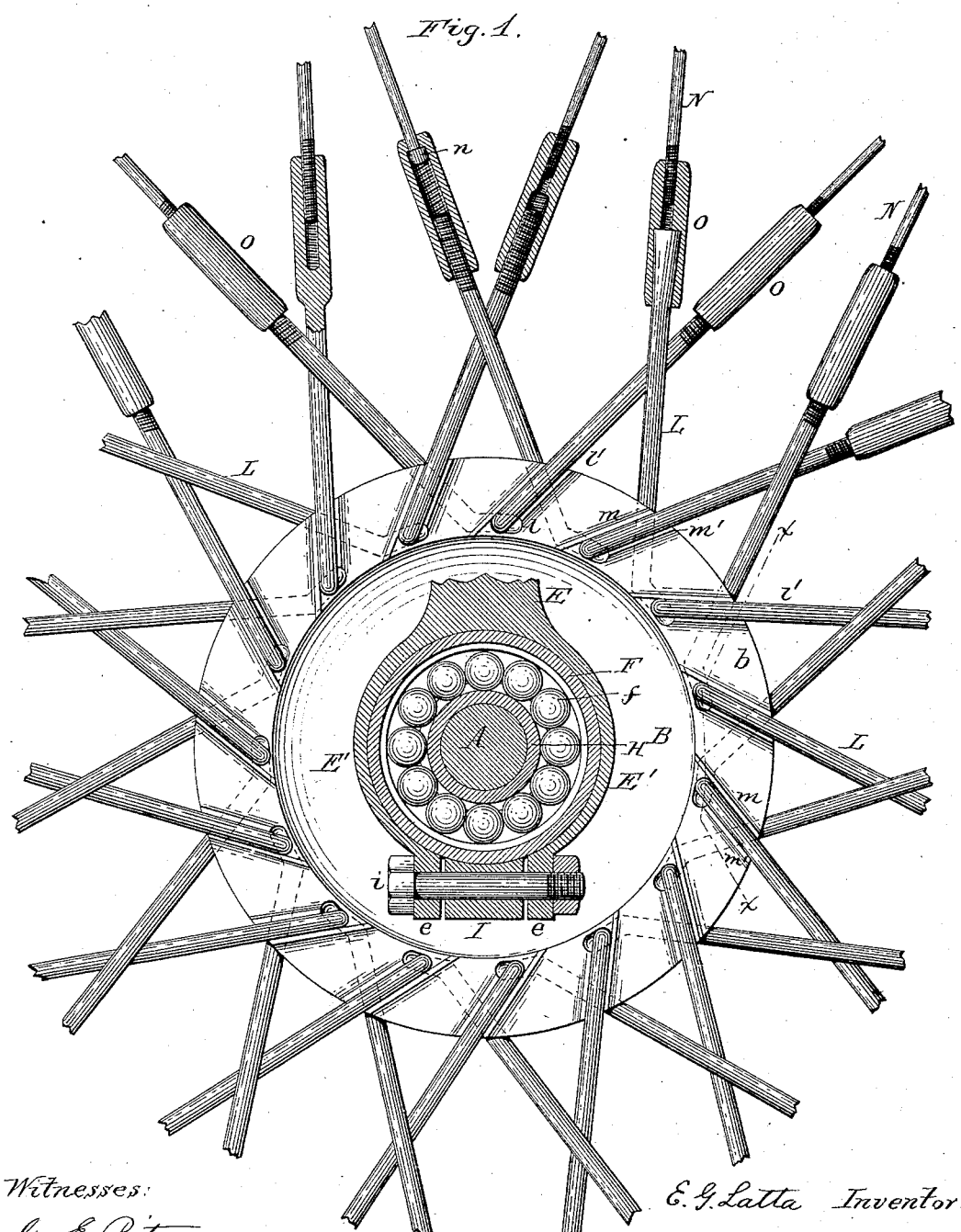
Witnesses:
Geo. E. Pitman
Otto H. Krotz
E. G. Latta Inventor
By Wilhelm Bonner
Attorneys.

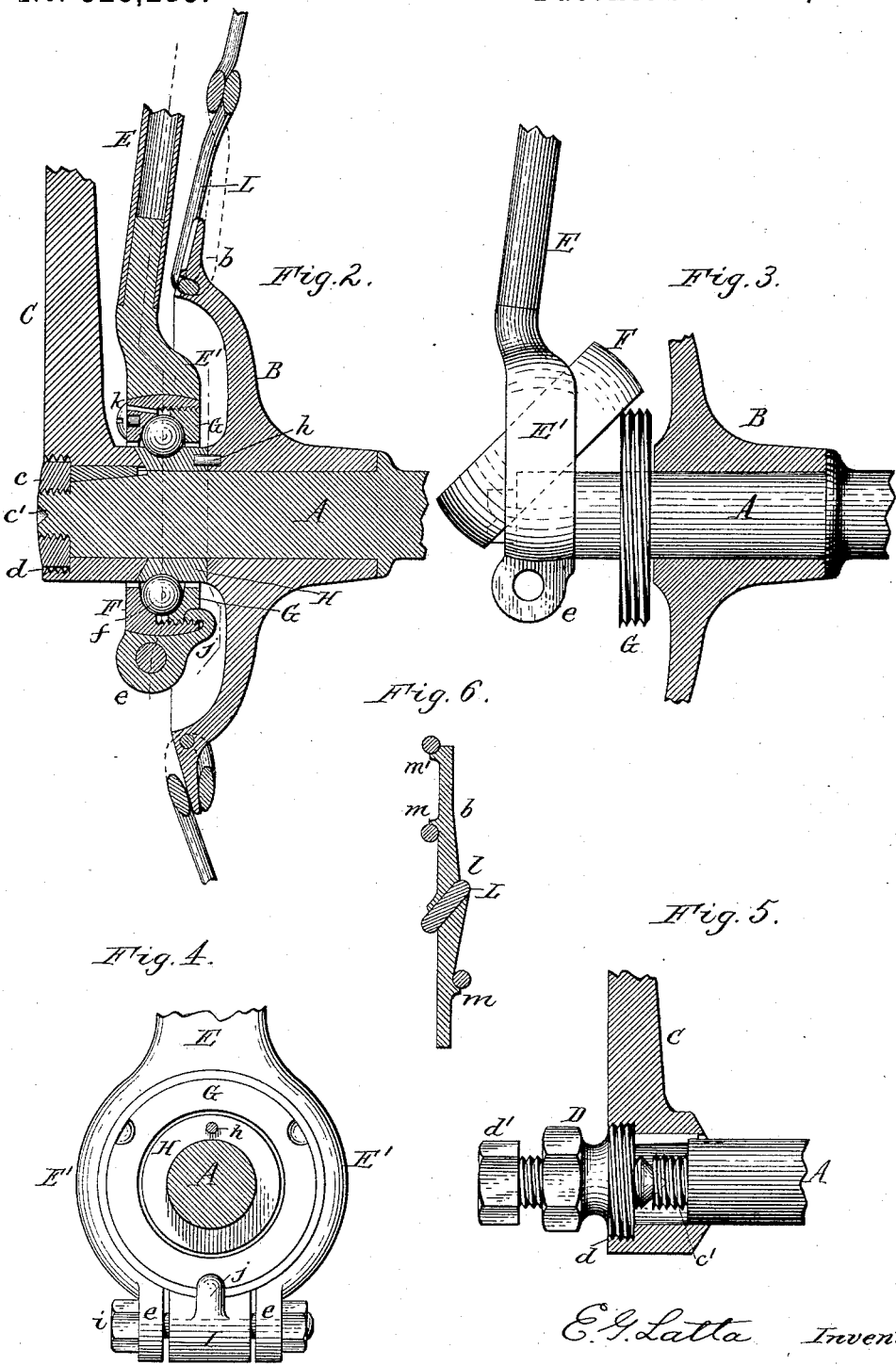

UNITED STATES PATENT OFFICE.

EMMIT G. LATTA, OF FRIENDSHIP, NEW YORK, ASSIGNOR OF ONE-HALF TO ADRIAN C. LATTA, OF SAME PLACE.

VELOCIPEDE.

SPECIFICATION forming part of Letters Patent No. 328,235, dated October 13, 1885.

Application filed December 10, 1884. Serial No. 150,010. (No model.)

*To all whom it may concern:*

Be it known that I, EMMIT G. LATTA, of Friendship, in the county of Allegany and State of New York, have invented new and useful Improvements in Velocipedes, of which the following is a specification.

The object of this invention is to increase the strength and durability of the wheel without increasing its weight and to render the wheel more rigid and to provide means whereby the spokes can be readily adjusted or replaced when broken.

A further object of my invention is to improve the ball-bearings by making them capable of very fine adjustment and by attaching them to the fork in such manner that they will properly align themselves on the axle and by dispensing with the usual hinge-bolt as a means of attachment and yet permit the bearings to be applied without unduly straining the fork.

A further object of my invention is to improve the means whereby the cranks are secured to the axle and to provide ready means for detaching the cranks from the axle when desired.

To these ends my invention consists of the improvements which will be hereinafter fully described, and pointed out in the claims.

In the accompanying drawings, consisting of two sheets, Figure 1 is a sectional side elevation of the central part of the wheel. Fig. 2 is a longitudinal section of one end of the axle and parts connected therewith. Fig. 3 is a similar view illustrating the means of applying the bearings. Fig. 4 is a rear elevation of the bearing. Fig. 5 is a longitudinal sectional elevation of the outer end of the axle, illustrating the manner of detaching the crank therefrom. Fig. 6 is a sectional view of the hub-flange in line $x$ $x$, Fig. 1.

Like letters of reference refer to like parts in the several figures.

A represents the axle, and B the dished hub-disk secured thereto in any suitable and well-known manner, and provided with a marginal flange, $b$.

C represents the crank secured to the end of the axle A by means of a screw-nut, $c$, which engages with a threaded shank, $c'$, on the end of the axle. The screw-nut $c$ is seated in a recess, $d$, formed in the outer portion of the crank-boss and bears against a shoulder or offset in the opening of the crank-boss. The outer face of the nut $c$ is flush, or nearly so, with the outer face of the crank-boss, and the nut is smaller than the recess $d$, so that it can be screwed home by means of a suitable wrench which engages in openings in the outer side of the nut without defacing the internal screw-thread with which the recess $d$ is provided.

D in Fig. 5 represents a screw which fits into the threaded opening $d$, and which is provided with a screw-threaded bore, which latter receives a screw-bolt, $d'$. Upon removing the screw-nut $c$ from the end of the axle and screwing the screw D into the threaded recess $d$ and then screwing the bolt $d'$ into the threaded opening of the screw D against the outer end of the axle A, the crank C is forced outwardly on the axle until it is detached therefrom. This device is equally applicable to the removal of the crank from the shaft, whether the crank is held against turning on the shaft by a key or by a flat-sided seat, and forms a ready means for detaching the crank without defacing the parts.

E represents the lower end of the fork or frame, which is divided into two arms, E', which extend around the axle and terminate below the axle in lugs $e$ $e$.

F represents the front part, G the rear part, and H the inner part, of the ball-bearing, which is held between the arms E'. The front part, F, is larger in diameter than the rear part, G, and has on its rear side a threaded opening in which the part G is secured by an external screw-thread formed on said part, so that the part G screws into the part F from the rear.

$f$ are the balls interposed between the parts F, G, and H. The opposite faces of the parts F and G and the outer face of the cylindrical part H are provided with annular grooves of the proper form to constitute together an annular groove in which the balls $f$ play. By securing the parts F and G together these parts of the box are adjusted to compensate for any wear, and the balls are forced into more intimate contact with the part H. The periphery of the face of the part F is made spherical to fit in a correspondingly-shaped recess formed in the inner face of the arms E'. The space between the lugs e is occupied by a block, I, which is secured in place by a bolt, i. The upper face of the block I is also made spherical to form with the inner faces of the arms E' a spherical seat for the part F. The lugs e are arranged so far apart that the part F of the box can be passed edgewise through the spaces between these lugs, and it can then be turned into its normal position in which it is seated between the arms E', and in which it is free to turn in any direction, but cannot become detached accidentally. When the part F has been placed in its seat, the part G is placed over the end of the axle, and the upper portion of the part F is tipped toward the hub, as represented in Fig. 3, and the lugs e e are dropped over the axle, when, by springing the fork slightly, the lower edge of the part F is permitted to swing in line with the arms E' and assume a position in which it surrounds the axle. The forks will bear springing to this extent without becoming bent or otherwise injured; but they will not bear to be sprung so far apart that they can be placed clear over the outer end of the axle. The collar H is now placed upon the end of the axle and pushed in toward the hub.

h represents a pin secured in the outer side of the hub and entering an opening in the inner side of the collar H, whereby the collar is prevented from turning on the axle. The balls are next inserted, and the part G is screwed into the part F to confine the balls. The block I is next secured between the lugs e e by means of the bolt i. The block I is provided on its rear side with a hook, j, which engages in one of a series of holes formed in the inner side of the part G, whereby the latter is prevented from turning. The parts F and G are next carefully adjusted to the balls by turning the outer part, F. This may be done by pressing against the oil-hole screw k, or in any other suitable manner, so as to cause the parts F and G to screw together, as may be necessary. When the proper adjustment has been obtained, the parts are clamped in position by tightening the bolt i. This construction permits of a very fine adjustment, and enables the bearing-box to properly align itself to the balls, even if the parts are not made perfectly true, and in case of accident it enables the rider to loosen the bolt i and relieve the box from side strain caused by the springing of the fork and again tightening it, when it will run as free as usual.

L represents the inner portions of the spokes, which are attached to the hub-flange b by passing these portions through openings l formed in the said flange, so that the inner portion, l', of the spoke lies against the outer side of the flange b, and the other portion of the spoke against the inner side of the flange. Ordinarily the openings l are arranged parallel with the axle, which necessitates sharp or abrupt bends of the spoke at both sides of the openings l, whereby the spoke is weakened. In order to avoid this, the openings l are formed obliquely through the hub-flange, whereby the bends of the spoke are made less abrupt and the original strength of the spokes substantially maintained, and a larger bearing-surface of the spoke in the hub-flange is secured. The outer and inner sides of the hub-flange are provided with ribs m m', which form a seat or recess for the spoke and securely hold the spoke in position on the hub-flange. These ribs permit the spokes to be intimately and closely soldered to the flange and prevent the hub from twisting in the wheel and materially strengthen the spokes and overcome to a great extent the tendency of the spokes to break off at the point where they pass through the hub.

Instead of forming the hub-flange with plain outer and inner side and raised ribs, both sides of the hub-flange may be corrugated or grooved to form seats for the spokes.

The hub-flange b is made tapering outwardly, as represented in Fig. 2, whereby the increased thickness of the inner portion of the flange serves to properly support the strain on the spokes passing through it, while the thin outer portion of the flange is sufficiently strong to bear the slight side strains to which the spokes are subjected, and permits the spokes from the opposite sides of the flange to be brought nearly to the same plane, thereby reducing the tendency of the hub to twist in the wheel.

N represents the outer portions of the spokes, which are secured to the inner portions, L, by coupling-sleeves O. The inner portions, L, are made larger than the outer portions, N, to increase the strength of these inner portions at the point where the greatest strength is required, while the outer portions, N, are rendered light, thereby reducing the weight of the wheel without sacrificing strength. Where the spokes cross each other they are interlocked by bending the spokes, as represented in Fig. 2, in order to bring the straight portions of the spokes in the same plane, thereby reducing atmospheric resistance and permitting them to be soldered together with greater security, reducing the quantity of solder required for the purpose, and improving the appearance of the wheel.

The sleeve O may be provided with an internal screw-thread in which the threaded end of the inner portions, L, in the spoke engages, and the inner end of the outer portion, N, may be provided with a head, n, which can slide in the sleeve when the rim of the wheel is deflected in passing over an obstruction. In this construction both ends of the upper portions, N, of the spoke are headed, and one of the heads is formed on the spoke after it is passed through the nipple and rim. The coupling-sleeve O may be provided with two threaded openings in which the threaded ends of the portions L and N of the spoke are secured, or the sleeve O may be secured to the portion L by brazing, and the portion N may be secured by a screw-thread, or the sleeve may be formed directly on the portion L of the spoke. All of these constructions are shown in Fig. 1.

If desired, the inner portion of the spoke may be flattened where it passes over the hub-flange, or it may be made of sheet metal.

The herein-described construction of the hub and spoke permits the use of smaller or lighter hub-disks than heretofore without rendering the wheel less rigid, and also permits the wheel to be made very narrow without reducing its strength. The inner portions, L, of the spokes may be made tapering from the hub-flange toward the coupling-sleeve O if it is desired to reduce the diameter of such sleeves.

I claim as my invention—

1. The combination, with the axle provided with a threaded shank, $c'$, of a crank having an internally-threaded opening, $d$, and a screw nut, $c$, made smaller than the opening $d$, to pass freely through the same, substantially as set forth.

2. The combination, with the axle and the crank having an internally-threaded opening, $d$, of the screw D, engaging in the opening, $d$, and a screw, $d'$, working in a threaded opening in the screw D and bearing against the axle, substantially as set forth.

3. A ball-bearing for velocipedes, consisting of a solid annular box, F, having a spherical outer face and provided with an internal annular cone or bearing surface formed integral with the box, an annular screw or cone, G, held against turning and engaging in an internal screw-thread formed in the box, a collar, H, and balls interposed between the cone of the box F, the cone G, and the collar H, substantially as set forth.

4. The combination, with the laced spokes, of a hub having its flange provided with openings through which the spokes are drawn and seats formed on the inner and outer sides of the flanges in which the spokes are held against displacement, substantially as set forth.

5. The combination, with a laced or bent spoke, of a hub having its flange $b$ provided with an oblique opening through which the spoke is drawn and ribs $m$ $m'$, whereby the spoke is confined against both sides of the hub-flange, substantially as set forth.

6. The combination, with a bent spoke, of a hub having its flange provided with an oblique opening through which the spoke is drawn, substantially as set forth.

7. The combination, with the hub, of laced spokes composed of a bent heavy portion, L, inserted through an opening in the flange of the hub, and outer light portions, N, secured to both ends of the portion L, substantially as set forth.

8. The combination, with the hub, of laced spokes composed of a bent heavy portion, L, inserted through an opening in the flange of the hub, outer light portions, N, and couplings O, whereby the outer portions, N, are secured to both ends of the inner portion, L, substantially as set forth.

9. The combination, with the hub, of laced spokes composed of an inner portion, L, inserted through an opening in the flange of the hub and provided with threaded outer ends, outer portions, N, provided with headed inner ends, and coupling-sleeves O, secured to the threaded ends of the portion L and receiving the headed ends of the portions N, substantially as set forth.

10. The combination, with the hub, of two spokes crossing each other and bent near their points of crossing to interlock with each other, whereby the straight portions of the spokes are arranged in the same plane, substantially as set forth.

Witness my hand this 2d day of December, 1884.

EMMIT G. LATTA.

Witnesses:
F. B. CHURCH,
S. E. LATTA.